(12) United States Patent
Thompson et al.

(10) Patent No.: US 10,782,391 B2
(45) Date of Patent: Sep. 22, 2020

(54) PROCESSING RECEIVED RADIATION REFLECTED FROM A TARGET

(71) Applicant: TRW Limited, Solihull, West Midlands (GB)

(72) Inventors: Martin John Thompson, Solihull (GB); Adam John Heenan, Chesterfield (GB); Ernest Casaban Lillo, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 314 days.

(21) Appl. No.: 15/751,238

(22) PCT Filed: Aug. 11, 2016

(86) PCT No.: PCT/GB2016/052504
§ 371 (c)(1),
(2) Date: Feb. 8, 2018

(87) PCT Pub. No.: WO2017/025754
PCT Pub. Date: Feb. 16, 2017

(65) Prior Publication Data
US 2018/0231637 A1     Aug. 16, 2018

(30) Foreign Application Priority Data

Aug. 12, 2015   (GB) .................................. 1514249.0

(51) Int. Cl.
*G01S 7/41*         (2006.01)
*G01S 17/58*       (2006.01)
(Continued)

(52) U.S. Cl.
CPC ............ *G01S 7/415* (2013.01); *G01S 7/4802* (2013.01); *G01S 7/539* (2013.01); *G01S 13/003* (2013.01);
(Continued)

(58) Field of Classification Search
CPC ...... G01S 7/415; G01S 17/931; G01S 13/726; G01S 13/584; G01S 13/06; G01S 13/583;
(Continued)

(56) References Cited

U.S. PATENT DOCUMENTS 4,112,496 A   9/1978   Stevens
6,385,511 B1  5/2002   Fondeur et al.
(Continued)

FOREIGN PATENT DOCUMENTS

CA   2135215 A1   5/1996
CA   2304083 A1   10/2000
(Continued)

OTHER PUBLICATIONS

Brooker, "Understanding Millimetre Wave FMCW Radars", 1st International Conference on Sensing Technology, 2005, pp. 152-157.
(Continued)

*Primary Examiner* — Olumide Ajibade Akonai
(74) *Attorney, Agent, or Firm* — MacMillan, Sobanski & Todd, LLC

(57) ABSTRACT

A method of and apparatus for processing received radiation (e.g. RADAR radiation) reflected from a target, the method comprising generating a set of predicted targets, the set of predicted targets comprising at least one member, each member representing a state of the target, generating a predicted waveform for the radiation for each member dependent upon the state of the target, and comparing each predicted waveform with a waveform of the received radiation to determine the accuracy with which the state of the target represented by the member for which the predicted waveform was generated matches an actual state of the target.

23 Claims, 3 Drawing Sheets

(51) Int. Cl.
  *G01S 7/48* (2006.01)
  *G01S 13/34* (2006.01)
  *G01S 15/58* (2006.01)
  *G01S 13/00* (2006.01)
  *G01S 13/72* (2006.01)
  *G01S 17/931* (2020.01)
  *G01S 13/06* (2006.01)
  *G01S 7/539* (2006.01)
  *G01S 13/931* (2020.01)
  *G01S 13/58* (2006.01)
  *G01S 15/06* (2006.01)
  *G01S 15/931* (2020.01)
  *G01S 13/46* (2006.01)
  *G01S 15/34* (2006.01)

(52) U.S. Cl.
  CPC ............. *G01S 13/06* (2013.01); *G01S 13/34* (2013.01); *G01S 13/583* (2013.01); *G01S 13/584* (2013.01); *G01S 13/726* (2013.01); *G01S 13/931* (2013.01); *G01S 15/06* (2013.01); *G01S 15/586* (2013.01); *G01S 15/931* (2013.01); *G01S 17/58* (2013.01); *G01S 17/931* (2020.01); *G01S 15/34* (2013.01); *G01S 2013/466* (2013.01); *G01S 2013/468* (2013.01); *G01S 2013/9323* (2020.01); *G01S 2013/9324* (2020.01); *G01S 2013/93271* (2020.01)

(58) Field of Classification Search
  CPC ........ G01S 15/06; G01S 15/931; G01S 17/58; G01S 7/4802; G01S 7/539; G01S 13/34; G01S 13/931; G01S 15/586; G01S 2013/9323; G01S 2013/9324; G01S 2013/93271; G01S 2013/468; G01S 15/34; G01S 17/003; G01S 13/865; G01S 17/10; G06K 9/00805; B60Q 9/008; B60W 2420/52
  See application file for complete search history.

(56) References Cited

U.S. PATENT DOCUMENTS

| | | | |
|---|---|---|---|
| 7,075,315 B2* | 7/2006 | Tanaka | G01N 21/95 324/337 |
| 8,872,693 B1 | 10/2014 | Malas et al. | |
| 2004/0111038 A1 | 6/2004 | Salla et al. | |
| 2006/0250294 A1* | 11/2006 | Zemany | G01S 13/003 342/22 |
| 2007/0247351 A1* | 10/2007 | Falk | G01S 13/0209 342/109 |
| 2010/0034054 A1 | 2/2010 | Wayland et al. | |
| 2011/0163905 A1 | 7/2011 | Denis et al. | |
| 2012/0016623 A1* | 1/2012 | Hayner | B60W 50/0205 702/141 |

FOREIGN PATENT DOCUMENTS

| | | |
|---|---|---|
| CA | 2304083 C | 5/2013 |
| DE | 19541459 A1 | 5/1997 |
| DE | 19845116 C1 | 12/1999 |
| DE | 102004020426 A1 | 11/2005 |
| EP | 1043603 A1 | 10/2000 |
| GB | 2325304 A | 11/1998 |
| JP | 6252478 A | 3/1987 |
| JP | 2007327935 A | 12/2007 |
| JP | 2010032319 A | 2/2010 |
| WO | 2004053521 A1 | 6/2004 |
| WO | 2017025754 A1 | 2/2017 |

OTHER PUBLICATIONS

UK Search Report, Application No. GB1514249.0 dated Jan. 12, 2016.
UK Search Report, Application No. GB1620912.4 dated May 19, 2017.
PCT International Search Report and the Written Opinion, Application No. PCT/GB2016/052504 filed Aug. 11, 2016, dated Nov. 2, 2016.

* cited by examiner

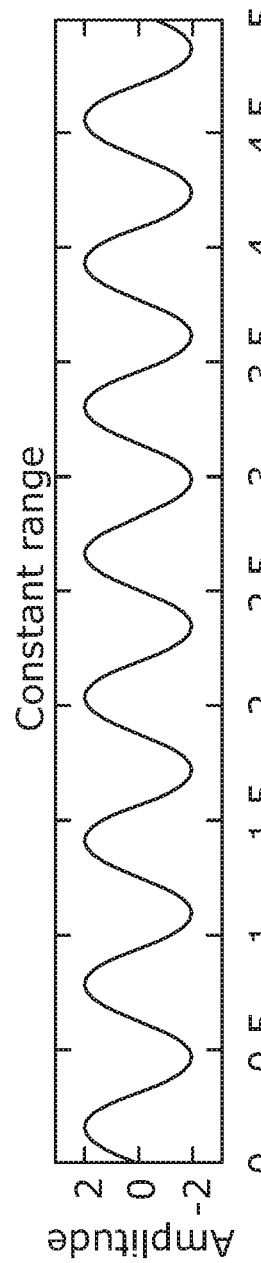
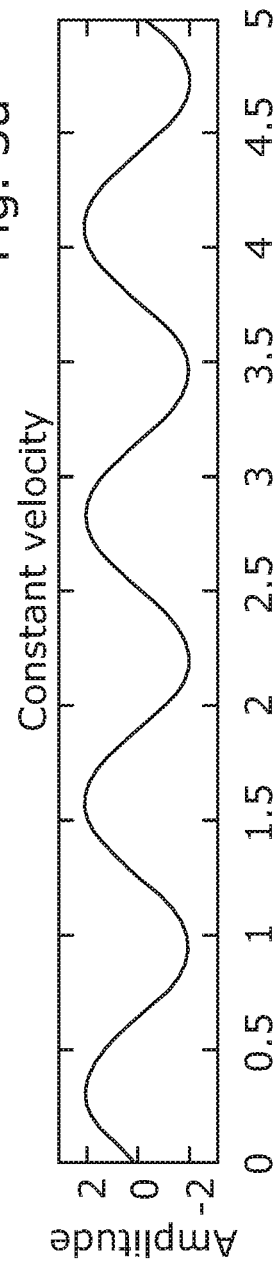
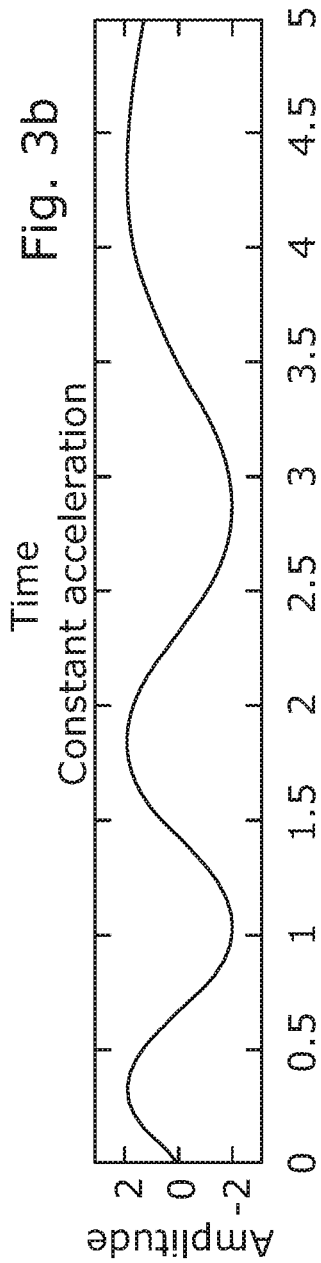
Fig. 3a
Fig. 3b
Fig. 3c

PROCESSING RECEIVED RADIATION REFLECTED FROM A TARGET

CROSS-REFERENCE TO RELATED APPLICATIONS

This application is a national stage of International Application No. PCT/GB2016/052504, filed 11 Aug. 2016, the disclosures of which are incorporated herein by reference in entirety, and which claimed priority to Great Britain Patent Application No. 1514249.0, filed 12 Aug. 2015, the disclosures of which are incorporated herein by reference in entirety.

BACKGROUND OF THE INVENTION

This invention relates to a method of processing received radiation reflected from a target, and associated apparatus.

Techniques using the collection of radiation reflected off a target are well known; examples of such techniques include RADAR (using radio waves), LIDAR (using light waves) and SONAR (using sound waves). Generally, some automatic processing of the received radiation is carried out so as to estimate data relating to the position of the target—for example range and/or bearing.

Taking the example of vehicular RADAR systems, which can be used for example to detect other vehicles around a host vehicle as described in the PCT patent application published as WO2004/053521, typically a frequency modulated continuous wave (FMCW) radar is used, which transmits a frequency modulated signal. In the example where the modulation is a simple sawtooth ramp, then the distance of an object can be estimated using the frequency difference between the transmitted output and reflected signals at the time of reception of the reflected signals. Typically, this would be done by mixing the output and input signals and detecting a beat signal. The speed of the object can be estimated using a further frequency component—a Doppler component—in the mixed signal.

To date, the analysis of such signals, an in particular in FMCW radar systems, have involved spectral analysis of the reflected signals. This means that the received reflected radiation (after typically having been mixed with the output signal) is converted into the frequency domain before further analysis takes place. The position and speed of targets can then be determined by looking for peaks in the determined frequency spectra. The typical mathematical method for calculating these spectra is the fast Fourier transformation (FFT). FFTs are processor-intensive to carry out, and use much memory bandwidth, as the algorithms used needs access to a wide area of memory in a non-sequential manner.

Furthermore, the data that can be returned from such spectral analysis is in effect limited to position and speed, acceleration and jerk (rate of change of acceleration) causing "smearing" of the signal between frequency bins. In order to perform the FFT algorithm, data needs to be batched into lengthy sequential chunks. This also means that an FFT will provide a time-averaged measure of the frequency spectrum over the period of the chunk.

BRIEF SUMMARY OF THE INVENTION

According to a first aspect of the invention, we provide a method of processing received radiation reflected from a target, the method comprising generating a set of predicted targets, the set of predicted targets comprising at least one member, each member representing a state of the target, generating a predicted waveform for the radiation for each member dependent upon the state of the target, and comparing each predicted waveform with a waveform of the received radiation to determine the accuracy with which the state of the target represented by the member for which the predicted waveform was generated matches an actual state of the target.

As such, we have appreciated that it is possible to make a comparison based on waveforms rather than spectra as has previously been the case. This removes the need to perform spectral analysis (fast Fourier transforms (FFT) and so on) and can be more flexible as to the parameters representing the state of the target.

Typically, the state of the target can include a parameter set comprising at least one parameter of the target. The parameter set may include positional data for the target; indeed, the parameter set can include the position of the target, typically relative to the position of a receiver of the radiation. The parameter set can also include at least one of the velocity, acceleration and jerk (rate of change of acceleration). The parameter set may also include a measurement of the extent of the target, for example a width or size of the target.

Typically, the method will comprise transmitting radiation from a transmitter, and receiving the received radiation at at least one receiver. There may be a plurality of receivers; as such, the step of generating a predicted waveform may comprise generating a predicted waveform for the received radiation received at each receiver and the step of comparing each predicted waveform will comprise comparing the predicted waveform for each receiver with radiation received at that receiver. Likewise, there may be a plurality of transmitters.

As such, this invention scales well to multiple receivers and receivers, predicting the received waveform at each receiver from each transmitter. The method may comprise mixing radiation received at each receiver with the radiation as transmitted by the transmitter and optionally low-pass-filtering the signal, and performing the comparison on the received radiation as mixed (and potentially filtered) with the transmitted radiation.

The step of comparing the predicted waveform with the waveform of the received radiation may comprise determining the correlation between the predicted waveform and the waveform of the received radiation. The method may comprise determining a degree of fit of each predicted waveform with the waveform of the received radiation by determining the degree of correlation of the predicted waveform and the waveform of the received radiation.

The step of generating the set of targets may comprise generating a set of members scattered through a parameter space defined by the parameter set. The members may be randomly, or pseudo-randomly, scattered throughout the parameter space. However, the scattering may be weighted to areas where it is more likely to find targets. For example, where the parameter set includes the position of the target and the receiver is mounted on a vehicle, the area directly ahead of the vehicle may be more highly weighted and so more frequently populated with members, whereas the areas to either side of directly ahead may be less highly weighted, and so less frequently populated with members, or typically where the first scattered members are evenly distributed in position space, then subsequent (or initial scattering) can be weighted around a perimeter of position space, equivalent to the edge of a field of view of the receiver(s), that being where new targets are like to appear.

After the comparison between predicted and received waveforms, the method may comprise repopulating the set of targets with members in the parameter space so that the members are scattered around the members of the set before repopulating preferentially with increasing degree of correlation. Fewer, or no members, may be scattered around members with a lower degree of correlation; indeed, members having a degree of correlation less than a threshold or those having the lowest degree of correlation may be removed from the set of targets.

After repopulating the set of targets, the method may repeat the step of comparing each predicted waveform, typically to a waveform of received radiation received subsequently to that used for the previous step of comparing. The steps of repopulating and comparing may repeat indefinitely; as such, this method may define a particle filter, using Monte Carlo methods to predict and detect targets in the received radiation. Such methods are more conveniently programmed than, for example, the FFT calculations previously used in methods employing spectral analysis. In particular, the methods described above may more conveniently be implemented in parallel processing systems (as it is easier to define a set of tasks for each processor to carry out), and memory access is more predictable, whereas FFTs generally require extremely non-sequential access to a large area of memory.

The step of repopulating the set of targets may comprise updating the parameters of each target based on an elapsed time between the reception of the original received radiation and the reception of the subsequently received reflected radiation. For example, where the parameters include position, speed (and potentially acceleration and/or jerk) and direction of motion, then the position of each target may be updated using equations of motion dependent on those parameters. Similarly, the speed would be updated using the acceleration and/or jerk, and the acceleration could be updated using the jerk.

Typically, at least some of the members and also their associated degree of correlation will be output by the method as potential targets. In one embodiment, only those members whose degree of correlation meets at least one criterion may be output; a criterion may be that the correlation exceeds a threshold.

A further advantage is that a comparison can be made immediately that radiation is received, with no necessary need to wait for a temporal block of data.

Typically, the method will also comprise generating and transmitting transmitted radiation to be reflected from each target to form the reflected radiation. The step of generating a predicted waveform may comprise estimating the waveform of the transmitted radiation and applying at least one transform to the waveform of the transmitted radiation in order to arrive at the predicted waveform. At least one transform will depend on each of the set of parameters. By starting with the transmitted radiation, allowance can be made for the operation of the transmitter transmitting the transmitted radiation; such a system is tolerant to inaccurate or non-linear modulation, whereas prior art spectrally analysed frequency modulated continuous wave (FMCW) radar is sensitive to the modulation used. Indeed, any convenient modulation scheme could be used, such as frequency modulated continuous wave (FMCW).

Where the set of parameters comprises the position of the target, at least one transform may comprise modifying the frequency and phase of the waveform dependent upon a range of the target from the receiver. Where multiple receivers are used, this may lead to the correct position of the target being quickly apparent, as position will be given by the point where the ranges with high correlation overlap.

Where the parameter set comprises the position of the target, at least one transform may comprise transforming the amplitude of the waveform dependent upon on the position of the target. This can lead to more accurate estimation of the parameters, because generally methods employing spectral analysis only use amplitude to determine the strength of the return (and so the confidence that such systems have in a putative target). The amplitude may be transformed dependent on the position so as to account for not only the size and/or position of a target (in particular, taking into account the decreasing signal amplitude with range of the target) but also differential transmitter and receiver behaviour with both range and/or bearing. Notably, many radar and other such system antennas have significant changes in gain based upon angular position (e.g. side lobes); this method can make use of that in estimating the parameters.

The method may comprise the step of steering the transmitted radiation and/or each receiver based upon a position of at least one target. Thus, particular where there are more highly correlated targets, or the highest correlated target or group of targets, or each target where the correlation exceeds a threshold, the transmitted radiation and/or the receivers can be directed to illuminate more particularly (for example, by increasing a dwell time in that area) the area in which those targets lie, and/or to steer each receiver such that those targets are in a more sensitive area of each receiver's field of view. In an example, a dwell time of a transmitter and/or a receiver for a given area may depend upon the correlation of the targets in that area.

The radiation may be radio waves (in which case the method may be a radar reflection processing method), light waves (in which case the method may be a LIDAR reflection processing method), sound waves (in which case the method may be a sonar reflection processing method) or any other convenient form of radiation.

According to a second aspect of the invention, there is provided a reflection processing apparatus, comprising an input for received reflected radiation, a processor arranged to process the received radiation and memory containing program instructions, the program instructions when executed on the processor causing the apparatus to carry out the method of the first aspect of the invention.

As such, the apparatus may further comprise a receiver at the input arranged to receive the reflected radiation. It may also comprise a transmitter circuit having at least one output for transmitted radiation. The receiver and each output of the transmitter circuit may be provided with an antenna.

The apparatus may be provided with an output, at which members and typically their associated degrees of correlation are output in use.

Other advantages of this invention will become apparent to those skilled in the art from the following detailed description of the preferred embodiments, when read in light of the accompanying drawings.

BRIEF DESCRIPTION OF THE DRAWINGS

FIG. 3a shows a first predicted waveform.
FIG. 3b shows a second predicted waveform.
FIG. 3c shows a third predicted waveform.

DETAILED DESCRIPTION OF THE DRAWINGS

Figure 1:
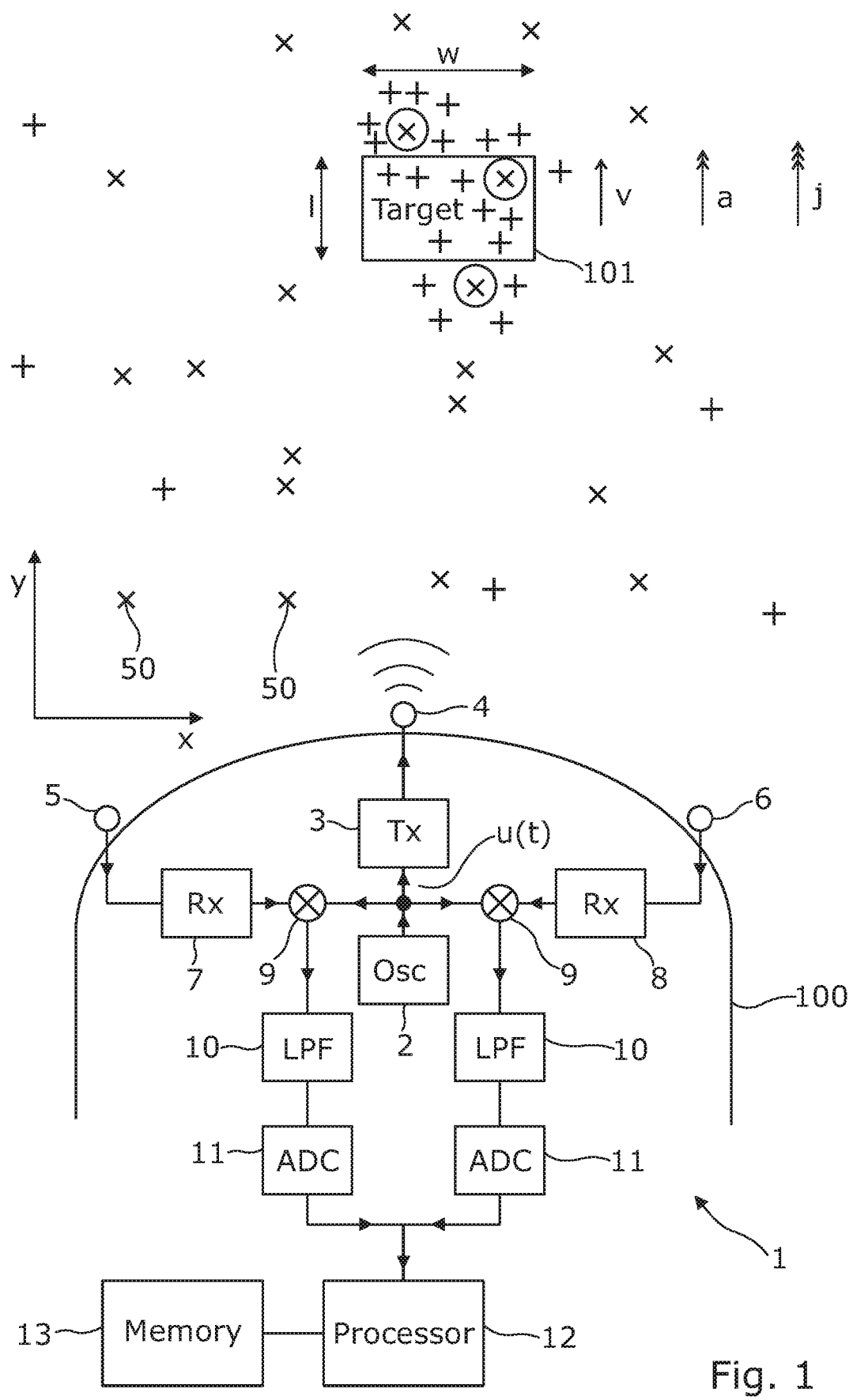
FIG. 1 shows a RARAR reflection processing apparatus in accordance with an embodiment of the invention installed in a vehicle.

FIG. 1 of the accompanying drawings shows a RADAR reflection processing apparatus 1 in accordance with an embodiment of the invention.

The apparatus 1 comprises an oscillator 2 which generates a frequency modulated continuous wave waveform u(t) and transmits that through transmitter circuit 3 and transmission antenna 4. The radio frequency electromagnetic radiation (radio waves) transmitted is directed ahead of a vehicle 100 on which the apparatus 1 is installed. The radiation can be reflected off any targets 101 that may be present in the area ahead of the vehicle.

Two reception antennas 5, 6 are provided on opposing lateral sides of the vehicle 100. These collect radiation reflected from any targets 101. The received signals are detected using reception circuits 7, 8 and mixed using mixers 9 with the transmitted signal u(t). The mixed signals are each passed through respective low pass filters 10 and analogue to digital converters (ADCs) 11, before being passed to a processor 12.

Figure 2:
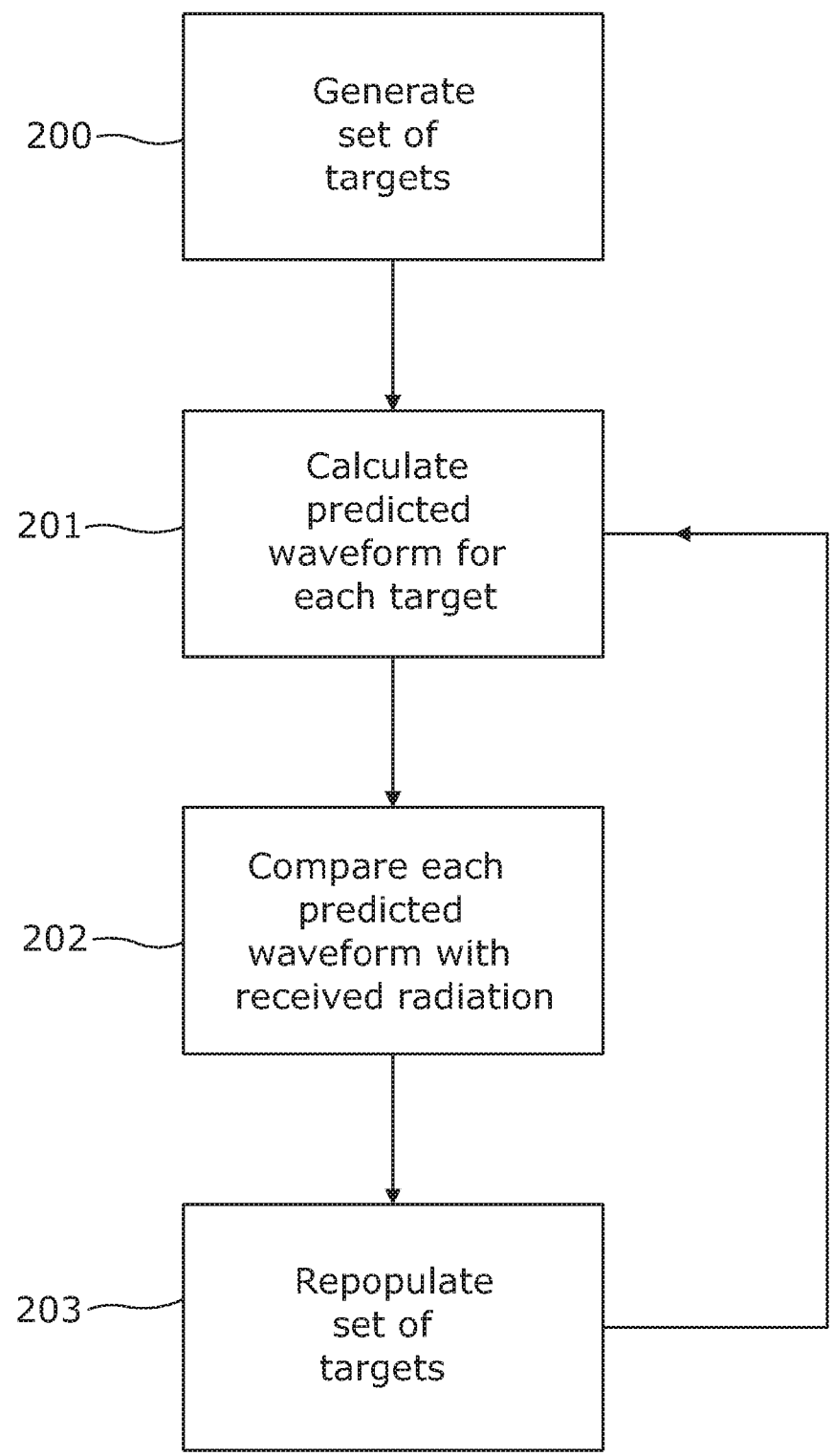
FIG. 2 shows a flow chart showing the operation of the processor of the apparatus of FIG. 1.

The processor carries out the steps shown in FIG. 2 of the accompanying drawings. In step 200, a set of target candidates is generated. In the order of a thousand to ten thousand candidates can be generated. Each candidate will have a position in a parameter space. The parameter space can have as many dimensions as desired. Typically, the dimensions can include position (shown as x and y in FIG. 1 of the accompanying drawings), speed v (and its direction), acceleration a (and its direction), jerk j (and its direction, jerk being the rate of change of acceleration), higher derivatives of jerk, the width w of the target 101 and its length l.

FIG. 1 of the accompanying drawings shows a set of target candidates 50 scattered through the parameter space; "X"s show the original set of target candidates. Because only two dimensions are available in the accompanying drawings, the points are shown scattered only through two-dimensional space, but each would also be scattered throughout the other parameter dimensions discussed. The scattering can be random or pseudo random, or can be regularly spaced throughout the parameter space, or can be spaced throughout parameter space with increasing density with increasing probability of a target being found in that area. For example, it may be more likely for there to be a target directly in front of the vehicle 100, and so the scattering of target candidates throughout the positional element of parameter space may be denser in that area than to either side.

At step 201, for each target, a predicted waveform for the radiation as received at each antenna 5, 6, received, mixed 9 and filtered 10 is generated using processor 12. In order to generate the expected time series return signal, an equation is required which will allow obtaining the predicted waveform of this filtered signal. For the simple example of a transmitted cosine wave with a linear increase of its frequency f over time (t is time, $f_1$ is a base frequency, $\frac{\Delta f}{\tau}$ is the rate of change of frequency with time):

$$f(t) = f_1 + \int_0^t \frac{\Delta f}{\tau} dt$$

A function of phase φ over time can be found as follows:

$$\frac{\Delta \phi}{dt} = f(t) \rightarrow \Delta \phi = \int f(t) dt = \int \left[ f_1 + \int_0^t \frac{\Delta f}{\tau} dt \right]$$

After integrating:

$$\phi(t) = 2\pi f_1 t + \pi t^2 \frac{\Delta f}{\tau}$$

The transmitted waveform is u(t)=cos(φ(t)). The received waveform is simply a delayed version of the same signal: r(t)=cos(φ(t−Δt)).

Using this expression the low frequency component of signal s(t) output by the mixer can be obtained as a function of time by multiplying transmitted and received signals and discarding high frequency terms, which will give the predicted waveform at any given instant:

$$s(t) = u(t) \times r(t) = \cos\phi(t) \times \cos\phi(t - \Delta t) = \cos\left(2\pi \Delta t \frac{\Delta f}{\tau} t + 2\pi f_1 \Delta t - \pi \Delta t^2 \frac{\Delta f}{\tau}\right)$$

For clarity, note that for any particular transmitted waveform exactly the same process can be carried out to obtain the expected mixer output waveform. The output is simply the multiplication of the transmitted waveform with a delayed version of the same waveform:

s(t)=u(t)×r(t)=u(t)×u(t−Δt)

The transmitted waveform can be modified to allow for the operation of the oscillator 2, transmission circuit 3 and antenna 4. For instance, if it is known that the oscillator 2 produces a FMCW modulation with what is nominally a linear saw-tooth ramp, but is non-linear to some extent, then that can be addressed in the definition of u(t). This is not the case with frequency domain FMCW analysis, where the accuracy of the system will be degraded with a non-linear modulation.

The predicted waveform can also be modified to correct for the performance of the reception antennas 5, 6, receiver circuits 7, 8, mixers 9, filters 10 and ADC 11. For example, if the reception antennas give higher gain directly ahead of the vehicle 100, but lower gain to either side, then the amplitude of the predicted waveform will depend upon the position of the targets.

Each of the parameters will have an effect on the predicted waveform. The position of the target will affect the delay between the transmitted and received signals, and so increasing range from the respective antenna 5, 6 will increase a phase shift between the transmitted and predicted signals. Increasing range may also decrease the amplitude of the predicted signals, in line with the inverse square law. Each of the predicted signals for the two antennas 5, 6 will have a different range, which can be used to triangulate the position of the target candidate relative to the vehicle.

The speed, acceleration and jerk of the vehicle will affect the frequency of the output signal, in accordance with the continuously varying time delay, as shown in FIGS. 3a to 3c of the accompanying drawings. FIG. 3a shows a target candidate with zero relative speed (constant frequency), constant relative speed (higher frequency) and constant relative acceleration (increasing frequency).

The width of the target will affect the amplitude of the received radiation; a wider target (having higher radar cross section) will have a higher amplitude response.

Once each predicted waveform has been generated, at step 202, a comparison is made between each predicted waveform and the output of the ADC. The correlation between each predicted waveform and the output of the ADC is calculated. This indicates how accurately the state of each target candidate reflects the actual target 101. Thus, in FIG. 1, those targets shown with a circled X will correlate particularly highly. Target candidates with a high correlation can be output by the processor; the correlation can be output as well to indicate a confidence which the processor 12 has with each target candidate.

In one embodiment where the transmitter antenna 4 and/or the reception antennas 5, 6 are steerable (for example, mechanically steerable, or phased array antennas, the antennas 4, 5, 6 may be directed to more particularly focus on any area where the correlation of targets in that area is particularly high. Where the antennas sweep across a field of view (FOV), having a dwell time in each area of the FOV, the dwell time (for subsequent iterations) may be higher for those areas with targets with higher correlation, and lower for those areas with targets with lower correlation (or which are lacking in targets).

At step 203, the set of target candidates is repopulated. Typically, those target candidates with a low correlation will be removed. Those with a high correlation will have their parameters updated based upon the time elapsed since the last received radiation (because, due to the speed, acceleration and jerk of the candidates, they will have moved within parameter space). Further new target candidates will be added, concentrated around the successful candidates. In the example of FIG. 1 (and only depicting two-dimensional space), the new target candidates could be those indicated with a + sign; some will still be positioned away from the successful candidates, but less densely than closer to the successful targets.

The method then repeats from step 201, with new predicted waveforms being generated and a comparison made to those predicted waveforms with newly-received radiation. Thus, each section of received radiation can be analysed as it is received; typically, prior art spectral analysis methods required $2^n$ samples, where n was between 10 and 14, whereas the current method can process received data down to individual samples.

As such, this method can have the following potential advantages over the prior art spectral analysis methods:

No reliance on frequency domain processing so easier to understand based on simple time-series principles.

Can process each return sample as it is captured. No need to capture blocks of data before processing. Reduces latency.

Easier treatment of arbitrary waveform modulation.

Ability to include higher order target motion models (that directly measure acceleration, jerk, higher order derivatives).

Ability to include other target parameters (e.g. width).

Ability to use information about antenna characteristics (e.g. sidelobes with differential gain) directly.

Easy extension to multiple transmit and receive antennas (including arbitrary array patterns).

Easy extension to 3-Dimensional target detection/tracking.

Processing technique is very highly parallelisable.

Easier to embed in low-cost hardware (e.g. FPGA).

Scales easily for more complex systems.

Ability to handle weak target returns due to removal of thresholding (where in spectral systems, the signal would be lost in noise; typically any frequency domain signal that is less strong than a threshold is discarded as noise).

Whilst this embodiment has been described with reference to RADAR, it is equally applicable to LIDAR or SONAR or other such systems.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of processing received radiation reflected from a target, the method comprising: generating a set of predicted targets, the set of predicted targets comprising at least one member, the at least one member representing a state of the target, generating a predicted waveform for the radiation for the at least one member dependent upon a state of the target, and comparing each predicted waveform with a waveform of the received radiation to determine an accuracy with which the state of the target represented by the at least one member for which the predicted waveform was generated matches an actual state of the target, in which the state of the target includes a parameter set comprising at least one parameter of the target, in which the step of generating the set of predicted targets comprises generating a set of members scattered through a parameter space defined by the parameter set, comprising, after the comparison between predicted and received waveforms, repopulating the set of predicted targets with members in the parameter space so that the members are scattered around the members of the parameter set before repopulating preferentially with increasing degree of correlation.

2. The method of claim 1, in which, no spectral analysis is made of the received radiation.

3. The method of claim 2, in which no fast Fourier transform, is made of the received radiation.

4. The method of claim 1, in which the parameter set includes positional data for the target.

5. The method of claim 4, in which the parameter set includes the position of the target.

6. The method of claim 1, in which the parameter set includes at least one of a velocity, acceleration and jerk.

7. The method of claim 1, in which the parameter set includes a measurement of an extent of the target.

8. The method of any of claim 7, in which the extent of the target is a width or size of the target.

9. The method of claim 1, comprising transmitting radiation from at least one transmitter, and receiving the received radiation at at least one receiver.

10. The method of claim 9 in which there are a plurality of receivers, in which the step of generating the predicted waveform comprises generating a predicted waveform for the received radiation received at each receiver and the step of comparing each predicted waveform comprises comparing the predicted waveform for each receiver with radiation received at that receiver.

11. The method of claim 10, comprising mixing radiation received at each receiver with radiation as transmitted by the transmitter and performing the comparison on the received radiation as mixed with the transmitted radiation.

12. The method of claim 9, in which the step of generating a predicted waveform comprises estimating the waveform of the transmitted radiation and applying at least one transform to the waveform of the transmitted radiation in order to arrive at the predicted waveform.

13. The method of claim 12, in which the at least one transform will depend on the parameter set.

14. The method of claim 12, in which the at least one transform comprises modifying a frequency and phase of the waveform dependent upon a range of the target from the at least one receiver.

15. The method of claim 12, in which at least one transform comprises transforming an amplitude of the waveform dependent upon on a position of the target.

16. The method of claim 9, comprising the step of steering the transmitted radiation and/or the at least one receiver based upon a position of the target.

17. The method of claim 1, in which the step of comparing each predicted waveform with the waveform of the received radiation comprises determining a correlation between the predicted waveform and the waveform of the received radiation.

18. The method of claim 1, in which members having a low degree of correlation are removed from the set of predicted targets.

19. The method of claim 1 comprising, after repopulating the set of predicted targets, repeating the step of comparing each predicted waveform to the waveform of the received radiation received subsequently to that used for the previous step of comparing.

20. The method of claim 19, in which the steps of repopulating and comparing repeat indefinitely.

21. The method of claim 1, in which the step of repopulating the set of predicted targets comprises updating the parameter set of each target based on an elapsed time between the reception of the original received radiation and the reception of the subsequently received radiation reflected.

22. The method of claim 1, in which at least some of the members and an associated degree of correlation thereof are output by the method as potential targets.

23. A reflection processing apparatus, comprising an input for received reflected radiation, a processor arranged to process the received radiation by carrying out the method of claim 1.

* * * * *